US006381712B1

(12) United States Patent
Nemitz

(10) Patent No.: US 6,381,712 B1
(45) Date of Patent: Apr. 30, 2002

(54) METHOD AND APPARATUS FOR PROVIDING AN ERROR MESSAGING SYSTEM

(75) Inventor: George Nemitz, Pennington, NJ (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/343,973

(22) Filed: Jun. 30, 1999

(51) Int. Cl.$^7$ ................................................. G06F 11/00
(52) U.S. Cl. ........................................... 714/57; 710/17
(58) Field of Search ............................. 714/57, 48, 47, 714/46, 44, 43, 39, 25; 710/17, 18, 19

(56) References Cited

U.S. PATENT DOCUMENTS

| | | | |
|---|---|---|---|
| 4,356,546 A | * | 10/1982 | Whiteside et al. .......... 364/200 |
| 4,866,712 A | * | 9/1989 | Chao .......................... 371/5.1 |
| 4,914,657 A | * | 4/1990 | Walter et al. .............. 371/11.3 |
| 4,945,471 A | * | 7/1990 | Neches ........................ 364/200 |
| 5,291,585 A | | 3/1994 | Sato et al. |
| 5,335,320 A | | 8/1994 | Iwata et al. |
| 5,345,550 A | | 9/1994 | Bloomfield |
| 5,347,627 A | | 9/1994 | Hoffmann et al. |
| 5,384,911 A | | 1/1995 | Bloomfield |
| 5,412,772 A | | 5/1995 | Monson |
| 5,414,806 A | | 5/1995 | Richards |
| 5,423,034 A | | 6/1995 | Cohen-Levy et al. |
| 5,430,836 A | | 7/1995 | Wolf et al. |
| 5,436,637 A | | 7/1995 | Gayraud et al. |
| 5,448,695 A | | 9/1995 | Douglas et al. |
| 5,461,399 A | | 10/1995 | Cragun |
| 5,461,710 A | | 10/1995 | Bloomfiled et al. |
| 5,473,745 A | | 12/1995 | Berry et al. |
| 5,487,147 A | * | 1/1996 | Brisson et al. .............. 395/180 |
| 5,491,784 A | | 2/1996 | Douglas et al. |
| 5,493,638 A | | 2/1996 | Hooper et al. |
| 5,499,364 A | * | 3/1996 | Klein et al. ............ 395/200.03 |
| 5,509,116 A | | 4/1996 | Hiraga et al. |
| 5,526,517 A | | 6/1996 | Jones et al. |
| 5,544,288 A | | 8/1996 | Morgan et al. |
| 5,546,519 A | | 8/1996 | Berry |
| 5,548,702 A | | 8/1996 | Li et al. |
| 5,550,968 A | | 8/1996 | Miller et al. |
| 5,559,942 A | | 9/1996 | Gough et al. |
| 5,564,003 A | | 10/1996 | Bell et al. |
| 5,566,330 A | | 10/1996 | Sheffield |
| 5,570,462 A | | 10/1996 | McFarland |
| 5,572,643 A | | 11/1996 | Judson |
| 5,694,603 A | | 12/1997 | Reiffin |
| 5,694,604 A | | 12/1997 | Reiffin |
| 5,712,856 A | * | 1/1998 | Finney et al. .............. 371/20.1 |
| 6,138,253 A | * | 10/2000 | Buzsaki ....................... 714/48 |

OTHER PUBLICATIONS

Ronald L. Johnston, "The Dynamic Incremental Compiler of APL/3000" Proceedings of the API '79 Conference, published as APL Quote Quad, 9(4), pp. 82–87.

Leo J. Guibas et al., "Compilation and Delayed Evaluation in APL," Fifth Annual Synposium on Principles in Programming Languages, pp. 1–8, 1978.

Gleen Krasner "The Smalltalk–80 Virtual Machine" BYTE Publications Inc., Aug. 1991, pp. 300–320.

\* cited by examiner

*Primary Examiner*—Nadeem Iqbal
(74) *Attorney, Agent, or Firm*—J. D. Harriman II, Esq.; Coudert Brothers LLP

(57) ABSTRACT

A standard platform independent messaging environment for use with devices is provided. The environment provides programming and operational building blocks that can be used to interface with existing data providing capabilities to identify, respond to, and report errors and failover conditions. Customizable decision logic is used to provide more sophisticated response and reporting capabilities, even though the basic device hardware and operation is not redesigned.

3 Claims, 2 Drawing Sheets

METHOD AND APPARATUS FOR PROVIDING AN ERROR MESSAGING SYSTEM

FIELD OF THE INVENTION

The present invention relates to error messaging systems and in particular, to an error messaging standard for electronic devices and components.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, Java, JavaOS, JavaStation, HotJava Views, JINI and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

BACKGROUND OF THE INVENTION

When a device fails, (breaks, stops working, works incorrectly) it is often difficult to figure out the reason for failure. Often this is because the device is not able to give any status information because it has failed. Another reason is that the device is not configured to be able to provide useful status information even when it is working correctly. Finally, even when a device does give status information, it may be in a proprietary format that requires specialized knowledge, documentation, or tools to understand.

Regardless of whether a device is an embedded device or not, it usually has a scheme for communicating its failures and status to the outside world. A failure identification can be as simple as a device not turning on, or a blinking or color coded LED indicating a problem. It can also be as sophisticated as sending an e-mail message of a device failure to a remote computer. Larger and more complex electronic components have more sophisticated mechanisms for identifying and communicating failures. This is important where there are many possible failure modes in a complex system, and the source of a problem can be more quickly identified by useful failure communication information.

When designing a device with electronic components, striving for reliability and serviceability are important competitive factors. But design cost is proportional to the level of reliability and serviceability achieved on the device. Obtaining reliability depends on the quality of electronic components selected, and the manufacturing process of the device. But even when high reliability is achieved, the possibility of device failure still exists. Therefore designing in advance for serviceability becomes equally as important as reliability. Obtaining high level of serviceability first depends on the accuracy, granularity, and ease of use in identifying what failed in a device.

A universal and reusable method for designing serviceability features capable of identifying and delivering device failures does not exist today. Therefore designing for serviceability today is device dependent, and can become costly depending on device's architecture. SNMP, (Simple network management protocol), and MIB, (Management information base), are two standards that provide some consistency in a method of managing errors, but both schemes are predominantly used for network specific devices, e.g. network interface cards, Ethernet hubs, and routers. The portability of these schemes to other environments is limited.

One problem with providing a universal error messaging system is the number of different "platforms" on which the system is required to operate. A platform is the combination of the hardware (e.g. processor) and software (e.g. operating system) that comprises a particular device. For example, a computer system with a processor manufactured by Intel and running the operating system known as Windows is considered to be a platform. An Intel computer running the DOS operating system is considered to be another platform. Other platforms include Sparc processor based computers from Sun Microsystems, Motorola processor based computers, and computers using the Unix operating system. In the prior art, software is often written specifically for a particular platform and will not run on other platforms. Such software is platform dependent.

SUMMARY OF THE INVENTION

A standard platform independent messaging environment for use with devices is provided. The environment provides programming and operational building blocks that can be used to interface with existing data providing capabilities to identify, respond to, and report errors and failover conditions. Customizable decision logic is used to provide more sophisticated response and reporting capabilities, even though the basic device hardware and operation is not redesigned.

BRIEF DESCRIPTION OF THE DRAWINGS

These and other features, aspects and advantages of the present invention will become better understood with regard to the following description, appended claims and accompanying drawings where:

DETAILED DESCRIPTION OF THE PREFERRED EMBODIMENT

Figure 1:
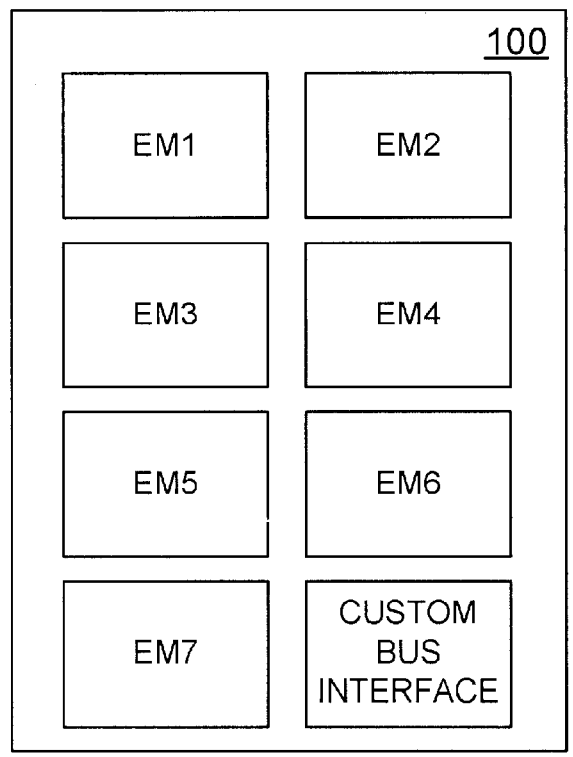
FIG. 1 is a block diagram of a prior art device having multiple electronic modules.

The invention is a method and apparatus for providing an error messaging system. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Many devices that could benefit from a standard messaging system are referred to as "smart" devices. For example, credit and debit cards are now referred to as "smart cards", and appliances, such as home appliances, computer peripherals, and other devices are also being referred to as smart devices. This often means that the device has some associated processing capability, such as from an embedded processor, and may also be referred to as an embedded device.

One attempt to introduce consistency to embedded and other devices is through the use of platform independent programming languages. The use of platform independent programming languages, such as the Java™ programming language, has been adapted for use in these non traditional computing environments. These environments include cell phones, "personal digital assistants" (PDAs), smart cards, appliances, and other environments that may lack the number and size of traditional computer system resources. For example, such embedded devices may have limited memory, reduced processing power, and simple or no operating systems. Such limited resources can prevent the use of some programming languages on the limited resource device. However, it has been possible to implement Java systems on embedded devices.

The present invention takes advantage of a platform independent protocol referred to as JINI that permits "spontaneous" networking. A device that implements the JINI system may be freely added to a network of other devices that implement the system. A description of JINI can be found at www.jini.org. JINI devices that connect to a network of other devices are capable of "managing themselves" on the network, avoiding the need for drivers and connection procedures.

The present invention proposes a standard for presenting error messages referred to here as the "JINI Error Messaging Standard"™, or "JEMS"™. JEMS is a universal and reusable method of delivering serviceability capabilities and is hardware architecture independent, meaning it is applicable to cars, stereos, large storage arrays, embedded devices, computer systems and other traditional and non-traditional computing environment. JEMS is based on the JINI technology infrastructure, where the Java programming language is implemented in a combination of software and hardware creating a distributed mechanism for devices, services, and users to dynamically join and detach from a network. By implementing the device hardware architecture on a device's modules, (from a service perspective, "field replaceable units", known as FRU's), JEMS allows a new paradigm and standard for error messaging and diagnosing to exist.

In one embodiment, JEMS consists of services that form the interactive basis for a system, that are dedicated to error messaging and error decision making on a device's FRU modules. With JEMS being a combination of both the infrastructure and the Java Beans programming model for the development of JEMS services, JEMS delivers a reusable method of designing serviceability and having it independent of the hardware and software architecture it is being designed for.

The architecture permits the use of existing technologies, but modified with hardware functionality at a relatively low cost. Where possible, JINI technology is used in each FRU of a device (note that sometimes the device itself is the FRU). By interfacing JINI technology on multiple FRU's and then tying them together with JEMS services, a distributive federation is created that is dedicated to delivering easy to interpret error messages outside the device's architecture. Since Java is the core of both JINI and JEMS, interfacing existing Java based management GUI's or deploying new phone home technology becomes relatively easy. With Java as the programmable language running in Java Virtual Machines as part of the device's FRU modules, error "decision making" can be done on a failing module itself.

Consider the situation of the device in FIG. 1. Device 100 comprises seven different electronic modules (which are the FRU's in this example) numbered EM1 through EM7. The device connects to a computer in order to receive commands via a propriety custom bus. In this example, the device 100 has a limited bus connection to its computer, making fault isolation difficult, and resulting in lengthy outages and downtime. Because the failing module does not identify itself, service repair technicians must test each module, or replace each module until the failed module is discovered (with working modules often replaced along the way). The device can be redesigned using the present invention to provide a more uniform and efficient error messaging system without requiring extensive redesign of existing hardware.

Figure 2:
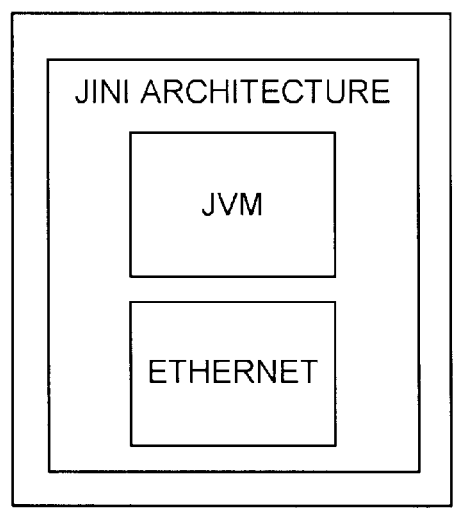
FIG. 2 is a view of an electronic module implementing the present invention.

One redesigned electronic module is illustrated in FIG. 2. The EM now includes one of the available architectures and correspondingly, a local JAVA Virtual Machine (JVM). The Java programming language is an object-oriented programming language with programs comprised of a number of different classes and interfaces. Unlike many programming languages, in which a program is compiled into machine-dependent, executable program code, programs written in the Java programming language are compiled into machine-independent bytecode classfiles. Each classfile contains code and data in a platform-independent format called the classfile format. The computer system acting as the execution vehicle contains a program called a virtual machine which is responsible for executing the bytecode. The virtual machine provides a level of abstraction between the machine-independent bytecode classes and the machine-dependent instruction set of the underlying computer hardware. Virtual machines exist for a variety of different operating systems.

Returning to FIG. 2, the redesigned device also has an Ethernet connection in addition to its virtual machine. The Ethernet connection is part of the standard and permits inter-module connectivity without the need for special bus design. The software (in addition to device architecture) includes JEMS services to run on each module.

JEMS consists of services that form the interactive basis for a system that is dedicated to error messaging and error decision making on a device's FRU modules. JEMS is based on the JINI infrastructure and javabeans programming model, where a JavaBean is defined as a reusable software component that can be manipulated visually with a visual builder tool. However, any other suitable programming system that can provide platform independence can be used without departing from the scope of the present invention.

The JEMS system defines a number of services defined as JEMS Beans which can be easily developed using visual development and builder tools into systems appropriate for a wide variety of applications. By combining the services provided by the JEMS Beans, an error system can be implemented on any FRU that can implement a system.

Some of the services available in the present invention include the following:

JEMS_Message_Event—The JEMS Bean responsible for providing a notification that an error event has occurred.

JEMS_Monitor_Event—the JEMS Bean responsible for identifying when a monitored threshold event has occurred.

JEMS_Monitor_Decision—The JEMS Bean that allows a design Engineer to plug in their own code (e.g. JAVA code) in order to make decision on what the device should do when a JEMS_Monitor_Event occurs.

JEMS_Monitor_Action—The JEMS Bean that is responsible for carrying out a monitored decision event.

JEMS_HA_Event—The JEMS Bean that provides notification when a failover event has occurred.

JEMS_HA_Decision—The JEMS Bean that allows a design Engineer to plug in their own code (such as JAVA in one embodiment) in order to make a failover decision when a JEMS_HA_Event has occurred.

JEMS_HA_Action—The JEMS Bean responsible for carrying out a HA failover event.

With the above services, some of which are standard and some of which are easily customizable, and with a standard communication protocol available to all systems, the present invention provides a flexible yet consistent scheme for implementing error messaging. Another advantage is that, because the system permits communication outside of the specific device architecture, the designer is not limited by available display space availability, but can deliver complex messages to another device attached to the network, such as a computer, that can present detailed messages to a user.

In some embodiments, a module is implemented for receiving and issuing commands from a connected computer. The JEMS services can be used to program redundant controller modules so that only one is operating at one time and the other is invoked based on a fail over message if the active controller fails.

In one embodiment of the present invention, the following JEMS beans are available to implement the JEMS system.

JEMS_Message_Event—Responsible for delivering an event message across the network wire to an error management GUI. JEMS_Message_Event implements a RMI remote interface.

JEMS_HA_Event—Responsible for notifying a failover event has occurred. The JEMS_HA_Event implements a RMI remote interface.

JEMS_HA_Decision—Responsible for implementing end user decision tree, which gets triggered upon receiving a JEMS_HA_Event. End user decision code becomes part of the JEMS_HA_Decision object via the JEMS Visual Connect Tool.

JEMS_Monitor_Event—Responsible for notifying a monitored threshold event has occurred. The JEMS_Monitor_Event implements a RMI remote interface.

JEMS_Monitor_Decision—The JEMS Bean that contain end user Java code dedicated for monitoring a JEMS FRU's resources. The JEMS_Monitor_Decision interface derives from the EventGenerator interface and would trigger upon receiving JEMS_Monitor_Event. End user monitoring code becomes part of the JEMS_Monitor_Decision object via the JEMS Visual Connect Tool.

JEMS_Monitor_Action—Responsible for carrying out a monitored decision event. The JEMS_Monitor_Action implements a RMI remote interface.

JEMS_Polling—Dedicated to JEMS FRU polling. The JEMS_Polling interface is derived from transaction interface which delivers transactional behaviors in order to assure all FRUs are operational and functional within a JEMS djinn.

JEMS_Firmware_Query—An interface derived from the transactional interface which delivers a JEMS hardware device's firmware revision when requested by a management GUI.

JEMS_On_Off_Event—Responsible for notifying a on/off scenario event has been requested, e.g. initiating a FRU, turning a FRU off/on, triggering an end user defined action to occur, etc. The JEMS_On_Off_Event interface is derived from the EventGenerator interface.

JEMS_On_Off_Action—Responsible for carrying out a on/off JEMS_On_Off_Event scenario. The JEMS_On_Off_Action interface derives from the RemoteEventListener and would trigger upon receiving a JEMS_On_Off_Event.

J_SNMP_Event—TBD
J_SNMP_Message—TBD
J_MIB_Event—TBD
J_MIB_Message—TBD
J_Diag_Event—TBD
J_Diag_Action—TBD
J_Diag_Message—TBD The following definitions are used with one embodiment of the present invention.

JEMS FRU:

The implementation of the hardware architecture on a device's circuit board module that is classified as a "Field Replaceable Unit", (FRU).

JEMS Device:

A hardware device that has one or more JEMS FRUs.

JEMS Bean:

Java objects that abide the Java Beans programming model and designed to deliver a specific service or functionality for a JEMS FRU.

JEMS Service:

A selection of one or more JEMS Bean within a single JEMS Group that would deliver JEMS functionality for a JEMS FRU. A JEMS Service is based on the technology infrastructure and programming model.

JEMS Group:

The three basic device architectures for implementing a service in hardware are as follows:

Devices with resident virtual Machines
Devices using specialized virtual machines
Clustering devices with a shared Virtual Machine.

JEMS djinn:

The definition of "djinn" is a single federation controlled by the system. A hardware device would have multiple circuit modules, (FRU's), would respectively have one or more JEMS Modules. Therefore a JEMS djinn would be defined as the one or more JEMS Services that would form a single federation for the device as a whole.

JEMS Federation:

One or more JEMS djinn environments combined to act as a single JEMS environment.

Because of the high level of communicability of the system, the message to the user that notifies of faults could even be a repair manual on-line that instructs the user how to respond to the error message. It could also trigger an email or telephone call to the appropriate person or station as necessary.

An advantage of the JEMS system is that it can be overlaid on an existing system as necessary. For example, if an existing device had a certain amount of data available but only had simple LED lights or simple number code display capability, the information conveyed by that device is limited and requires an associated code lookup table or experienced service person to interpret fail codes. Using JEMS, the designer could take advantage of the same data to send messages offline from the device to instantiate or provoke much more detailed messages.

Figure 3:
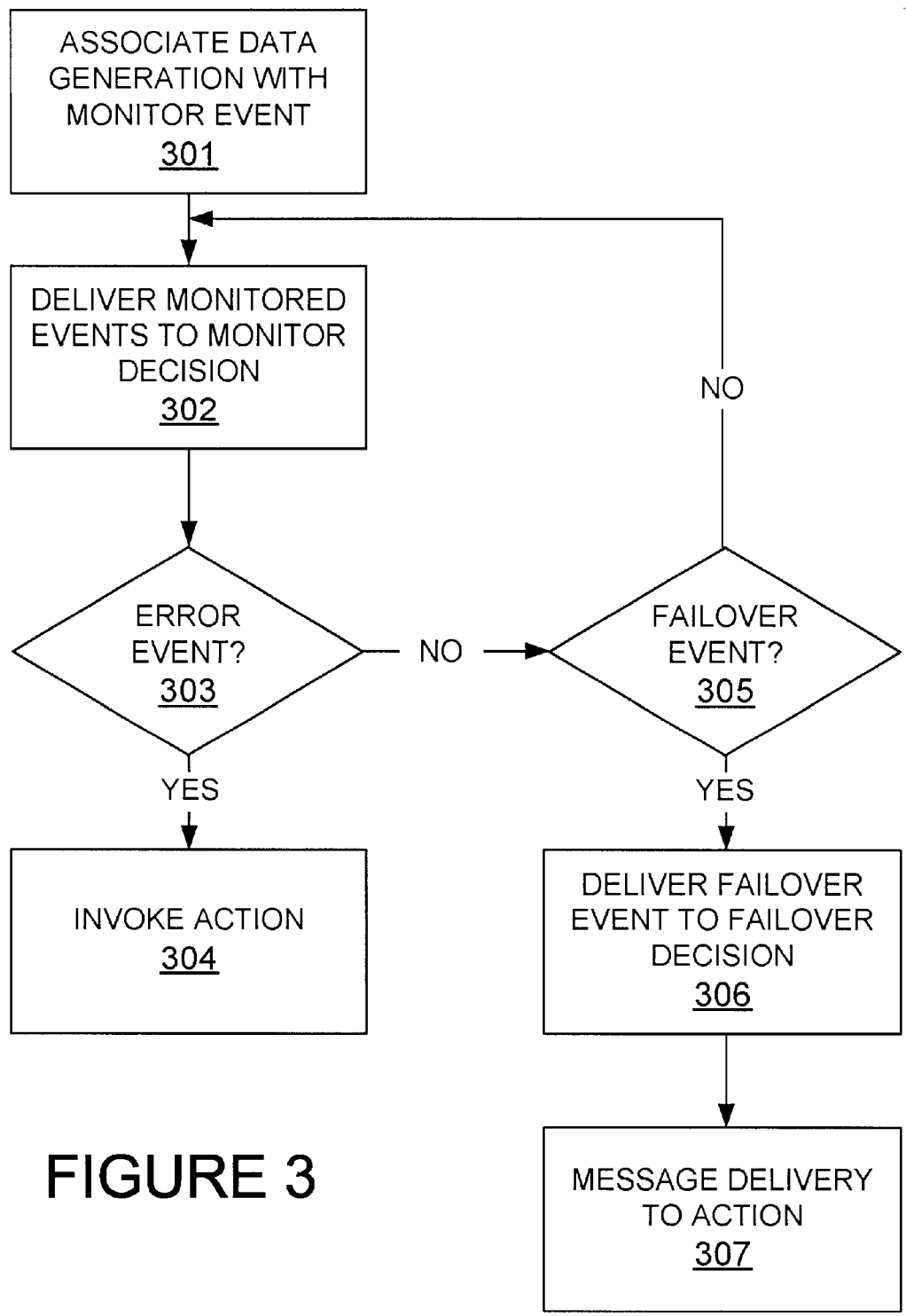
FIG. 3 is a flow diagram illustrating the operation of the present invention.

A flow diagram of the operation of creating a JEMS service or system for a device with existing data providing capabilities is illustrated in FIG. 3. Data that is available is monitored using one or more JEMS monitor events at step 301. Occurrence of events is provided to JEMS monitor decision at step 302. Not all events are necessarily error events, so a test is done at decision block 303 using JEMS monitor decision to see if the monitored event or events result in an error or error condition. The decision making capability is customizable by the implementer.

If the monitored event is an error event, the system triggers an appropriate action using JEMS_Monitor_Action at step 304. The action could initiate a graphical user interface based system to provide complex detail to a viewer or user of the event that occurred. In other situations, the message event could prompt an email, telephone call, or could even activate another network device, including network devices.

If the monitored event at step 303 is not an error event, the system tests to see if it is a failover event at step 305. If no, the system returns to step 302 and waits for more events. If the monitored event is a failover event, the system delivers the failover event to failover decision logic at step 306. The failover decision logic is also customizable as necessary. When appropriate, an action is initiated at step 307 based on the particular failover event.

The flow diagram of FIG. 3 illustrates the flexibility and backward compatibility of the present invention. The monitor events beans can be used to interface with the data generating capabilities that already exist for a device, so there is no need to redesign those aspects of a device converted to a JEMS environment. Other aspects of the JEMS system automatically provide notification and messaging to other customizable JEMS services so that improved reporting, self-diagnostics, and repair capability can be provided with essentially old data. Similarly, in failover situations, customized actions can be initiated as the user or developer desires.

Although the present invention has been described in considerable detail with regard to the preferred versions thereof, other versions are possible. Therefore, the appended claims should not be limited to the descriptions of the preferred versions contained herein.

I claim:

1. An apparatus comprising:

one or more devices coupled to a network;

a virtual machine associated with one or more of said devices;

program code executed by said virtual machine to respond to an event in said one or more devices, wherein said program code comprises:

a first object configured to identify when a threshold event occurs;

a second object configured to determine a response to said threshold event; and a third object configured to carry out said response.

2. An apparatus comprising:

one or more devices coupled to a network;

a virtual machine associated with one or more of said devices;

program code executed by said virtual machine to respond to an event in said one or more devices, wherein said program code comprises:

a first object configured to identify when a failover event occurs;

a second object configured to determine a response to said failover event; and a third object configured to carry out said response.

3. An apparatus comprising:

one or more devices coupled to a network;

a virtual machine associated with one or more of said devices;

program code executed by said virtual machine to respond to an event in said one or more devices, wherein said program code comprises:

a first object configured to identify when an on/off scenario is requested; and a second object configured to implement said on/off scenario.

* * * * *